US010275541B2

(12) United States Patent
Sharifi Tehrani et al.

(10) Patent No.: US 10,275,541 B2
(45) Date of Patent: Apr. 30, 2019

(54) PROACTIVE CORRECTIVE ACTIONS IN MEMORY BASED ON A PROBABILISTIC DATA STRUCTURE

(71) Applicant: Micron Technology, Inc., Boise, ID (US)

(72) Inventors: Saeed Sharifi Tehrani, San Diego, CA (US); Sivagnanam Parthasarathy, Carlsbad, CA (US)

(73) Assignee: Micron Technology, Inc., Boise, ID (US)

( * ) Notice: Subject to any disclaimer, the term of this patent is extended or adjusted under 35 U.S.C. 154(b) by 132 days.

(21) Appl. No.: 15/229,301

(22) Filed: Aug. 5, 2016

(65) Prior Publication Data

US 2018/0039535 A1 Feb. 8, 2018

(51) Int. Cl.
*G06F 11/00* (2006.01)
*G06F 17/30* (2006.01)

(52) U.S. Cl.
CPC ........ *G06F 17/30982* (2013.01); *G06F 11/00* (2013.01)

(58) Field of Classification Search
USPC ................................................ 714/6.11, 6.1
See application file for complete search history.

(56) References Cited

U.S. PATENT DOCUMENTS

| | | | |
|---|---|---|---|
| 9,384,126 B1 * | 7/2016 | Sprouse | G06F 12/0246 |
| 9,424,933 B2 | 8/2016 | Choi et al. | |
| 2008/0313132 A1 | 12/2008 | Hao et al. | |
| 2013/0227051 A1 * | 8/2013 | Khakpour | H04L 67/2842 709/213 |
| 2014/0149433 A1 | 5/2014 | Lakshminarayan et al. | |
| 2015/0046142 A1 * | 2/2015 | Ramamoorthy | G06F 12/0802 703/21 |
| 2015/0248931 A1 * | 9/2015 | Nazarian | G11C 13/004 365/148 |
| 2015/0270015 A1 | 9/2015 | Murphy et al. | |
| 2015/0372910 A1 * | 12/2015 | Janakiraman | H04L 45/74 370/392 |

FOREIGN PATENT DOCUMENTS

| | | |
|---|---|---|
| KR | 20150118650 A | 10/2015 |
| WO | 2015142806 A1 | 9/2015 |

OTHER PUBLICATIONS

Yun, et. al. "Bloom Filter-Based Dynamic Wear Leveling for Phase-Change RAM" IEEE Proceedings of the Conference Design, Automation & Test, Mar. 12-16, 2012 (Year: 2012).*

(Continued)

*Primary Examiner* — Sarai E Butler
(74) *Attorney, Agent, or Firm* — Brooks, Cameron & Huebsch, PLLC

(57) ABSTRACT

The present disclosure includes apparatuses and methods for proactive corrective actions in memory based on a probabilistic data structure. A number of embodiments include a memory, and circuitry configured to input information associated with a subset of data stored in the memory into a probabilistic data structure and proactively determine, at least partially using the probabilistic data structure, whether to take a corrective action on the subset of data stored in the memory.

31 Claims, 5 Drawing Sheets

(56) References Cited

OTHER PUBLICATIONS

Bloom "Space/Time Trade-offs in Hash Coding with Allowable Errors", Communications of the ACM, vol. 13, No. 7, Jul. 1970, pp. 422-426.
Broder, et al. "Network Applications of Bloom Filters: A Survey", Internet Mathematics, vol. 1, No. 4, Apr. 2004, pp. 485-509.
Fan, et al. "Summary Cache: A Scalable Wide-Area Web Cache Sharing Protocol", IEEE/ACM Transactions on Networking, vol. 8, No. 3, Jun. 2000, pp. 281-293.
Kirsch, et al. "Less Hashing, Same Performance: Building a Better Bloom Filter", Wiley Periodicals, May 15, 2008, pp. 187-218.
Yun, et al. "Bloom Filter-Based Dynamic Wear Leveling for Phase-Change RAM" IEEE Proceedings of the Conference on Design, Automation & Test, Mar. 12-16, 2012, pp. 1513-1518.
International Search Report and Written Opinion from related international application No. PCT/US2017/043594, dated Oct. 30, 2017, 14 pp.
Office Action from related Taiwanese patent application No. 106126460, dated Sep. 19, 2018, 16 pp.

\* cited by examiner

PROACTIVE CORRECTIVE ACTIONS IN MEMORY BASED ON A PROBABILISTIC DATA STRUCTURE

TECHNICAL FIELD

The present disclosure relates generally to semiconductor memory and methods, and more particularly, to proactive corrective actions in memory based on a probabilistic data structure.

BACKGROUND

Memory devices are typically provided as internal, semiconductor, integrated circuits and/or external removable devices in computers or other electronic devices. There are many different types of memory including volatile and non-volatile memory. Volatile memory can require power to maintain its data and can include random-access memory (RAM), dynamic random access memory (DRAM), and synchronous dynamic random access memory (SDRAM), among others. Non-volatile memory can retain stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory (e.g., NAND flash memory and/or NOR flash memory), and/or can include volatile memory (e.g., DRAM and/or SRAM), among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

Memory cells in an array architecture can be programmed to a target (e.g., desired) state. For instance, electric charge can be placed on or removed from the charge storage structure (e.g., floating gate) of a memory cell to program the cell to a particular data state. The stored charge on the charge storage structure of the memory cell can indicate a threshold voltage (Vt) of the cell.

For example, a single level cell (SLC) can be programmed to a targeted one of two different data states, which can be represented by the binary units 1 or 0. Some flash memory cells can be programmed to a targeted one of more than two data states (e.g., 1111, 0111, 0011, 1011, 1001, 0001, 0101, 1101, 1100, 0100, 0000, 1000, 1010, 0010, 0110, and 1110). Such cells may be referred to as multi state memory cells, multiunit cells, or multilevel cells (MLCs). MLCs can provide higher density memories without increasing the number of memory cells since each cell can represent more than one digit (e.g., more than one bit).

A state of a flash memory cell can be determined by sensing the stored charge on the charge storage structure (e.g., the Vt) of the cell. However, a number of mechanisms, such as read disturb, program disturb, cell-to-cell interference, and/or charge loss (e.g., charge leakage), for example, can cause the Vt of the memory cell to change, which may reduce the quality of the data stored in the memory. For example, a change in the Vt of a memory cell may cause the cell to be sensed to be in a state other than the target state (e.g., a state different than the state to which the cell was programmed). Such a reduction in the quality of the data may decrease the lifetime of the memory, and/or may cause the memory to fail, if corrective actions are not taken.

DETAILED DESCRIPTION

Figure 1:
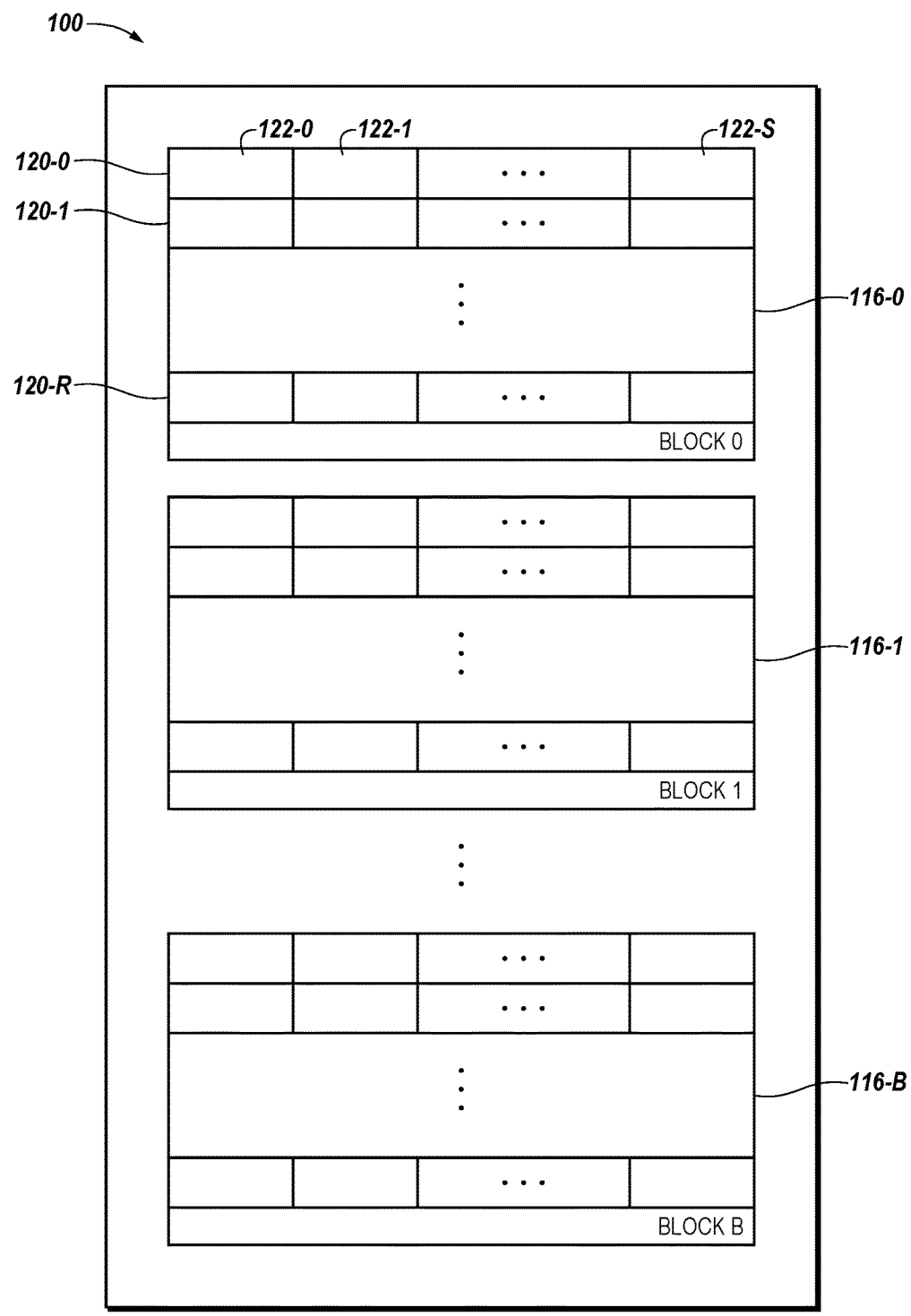
FIG. 1 illustrates a diagram of a portion of a memory array having a number of physical blocks in accordance with a number of embodiments of the present disclosure.

The present disclosure includes apparatuses and methods for proactive corrective actions in memory based on a probabilistic data structure. A number of embodiments include a memory, and circuitry configured to input information associated with a subset of data stored in the memory into a probabilistic data structure and proactively determine, at least partially using the probabilistic data structure, whether to take a corrective action on the subset of data stored in the memory.

Embodiments of the present disclosure may use a probabilistic data structure, such as, for instance, a counting Bloom filter, to track indicators of data quality in memory to proactively determine when corrective action may need to be taken on the data. For instance, embodiments of the present disclosure can use a probabilistic data structure to track read disturb, wear leveling, and/or hot and cold data classification, among other indicators (e.g., metrics) of data quality, to proactively determine when to take corrective action. As such, embodiments of the present disclosure can be used to reduce failures in the memory, and/or increase the lifetime of memory, among other benefits. Further, embodiments of the present disclosure may be suitable for fast and/or straightforward hardware and/or firmware implementation.

Further, by using a probabilistic data structure to track data quality indicators, embodiments of the present disclosure can use (e.g. consume) significantly less memory than previous approaches of tracking data quality indicators, such as approaches in which a different counter is assigned to track data quality indicators for each respective subset (e.g., block) of data stored in the memory. For instance, using a probabilistic data structure to track data quality indicators in accordance with the present disclosure can eliminate the need for the memory to include a different counter for each respective subset, as with such previous approaches. As such, embodiments of the present disclosure may use significantly less memory, for instance, approximately 75% less memory as an example, than such previous approaches for tracking data quality indicators.

Further, embodiments of the present disclosure can dynamically track data quality indicators in memory effectively and/or accurately (e.g., just as effectively and/or accurately as previous approaches that use significantly more memory). For example, the error rate associated with embodiments of the present disclosure (e.g., the rate at which corrective actions are taken when they may not actually be needed, and/or the rate at which corrective actions are not taken when they actually may be needed) may be negligible as compared to an ideal, error-free system. For instance, the error rate associated with embodiments of the present disclosure may be approximately $1.5 \times 10^5$, as an example.

As used herein, "a number of" something can refer to one or more such things. For example, a number of memory cells can refer to one or more memory cells. Additionally, the designators "R", "B", "S", "K", and "N", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits.

FIG. 1 illustrates a diagram of a portion of a memory array 100 having a number of physical blocks in accordance with a number of embodiments of the present disclosure. Memory array 100 can be, for example, a NAND flash memory array. However, embodiments of the present disclosure are not limited to a particular type of memory or memory array. For example, memory array 100 can be a DRAM array, an RRAM array, or a PCRAM array, among other types of memory arrays. Further, although not shown in FIG. 1, memory array 100 can be located on a particular semiconductor die along with various peripheral circuitry associated with the operation thereof.

As shown in FIG. 1, memory array 100 has a number of physical blocks 116-0 (BLOCK 0), 116-1 (BLOCK 1), . . . , 116-B (BLOCK B) of memory cells. The memory cells can be single level cells and/or multilevel cells such as, for instance, two level cells, triple level cells (TLCs) or quadruple level cells (QLCs). As an example, the number of physical blocks in memory array 100 may be 128 blocks, 512 blocks, or 1,024 blocks, but embodiments are not limited to a particular power of two or to any particular number of physical blocks in memory array 100.

A number of physical blocks of memory cells (e.g., blocks 116-0, 116-1, . . . , 116-B) can be included in a plane of memory cells, and a number of planes of memory cells can be included on a die. For instance, in the example shown in FIG. 1, each physical block 116-0, 116-1, . . . , 116-B can be part of a single die. That is, the portion of memory array 100 illustrated in FIG. 1 can be die of memory cells.

As shown in FIG. 1, each physical block 116-0, 116-1, . . . , 116-B includes a number of physical rows (e.g., 120-0, 120-1, . . . , 120-R) of memory cells coupled to access lines (e.g., word lines). The number of rows (e.g., word lines) in each physical block can be 32, but embodiments are not limited to a particular number of rows 120-0, 120-1, . . . , 120-R per physical block. Further, although not shown in FIG. 1, the memory cells can be coupled to sense lines (e.g., data lines and/or digit lines).

As one of ordinary skill in the art will appreciate, each row 120-0, 120-1, . . . , 120-R can include a number of pages of memory cells (e.g., physical pages). A physical page refers to a unit of programming and/or sensing (e.g., a number of memory cells that are programmed and/or sensed together as a functional group). In the embodiment shown in FIG. 1, each row 120-0, 120-1, . . . , 120-R comprises one physical page of memory cells. However, embodiments of the present disclosure are not so limited. For instance, in a number of embodiments, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

A program operation (e.g., a write operation) can include applying a number of program pulses (e.g., 16V-20V) to a selected word line in order to increase the threshold voltage (Vt) of the selected cells coupled to that selected word line to a desired program voltage level corresponding to a target (e.g., desired) data state. A sense operation, such as a read or program verify operation, can include sensing a voltage and/or current change of a sense line coupled to a selected cell in order to determine the data state of the selected cell.

In a number of embodiments of the present disclosure, and as shown in FIG. 1, a page of memory cells can comprise a number of physical sectors 122-0, 122-1, . . . , 122-S (e.g., subsets of memory cells). Each physical sector 122-0, 122-1, . . . , 122-S of cells can store a number of logical sectors of data (e.g., data words). Additionally, each logical sector of data can correspond to a portion of a particular page of data. As an example, a first logical sector of data stored in a particular physical sector can correspond to a logical sector corresponding to a first page of data, and a second logical sector of data stored in the particular physical sector can correspond to a second page of data. Each physical sector 122-0, 122-1, . . . , 122-S, can store system and/or user data, and/or can include overhead data, such as error correction code (ECC) data, logical block address (LBA) data, and recurring error data.

Logical block addressing is a scheme that can be used by a host for identifying a logical sector of data. For example, each logical sector can correspond to a unique logical block address (LBA). Additionally, an LBA may also correspond (e.g., dynamically map) to a physical address. A logical sector of data can be a number of bytes of data (e.g., 256 bytes, 512 bytes, or 1,024 bytes). However, embodiments are not limited to these examples.

It is noted that other configurations for the physical blocks 116-0, 116-1, . . . , 116-B, rows 120-0, 120-1, . . . , 120-R, sectors 122-0, 122-1, . . . , 122-S, and pages are possible. For example, rows 120-0, 120-1, . . . , 120-R of physical blocks 116-0, 116-1, . . . , 116-B can each store data corresponding to a single logical sector which can include, for example, more or less than 512 bytes of data.

Figure 2:
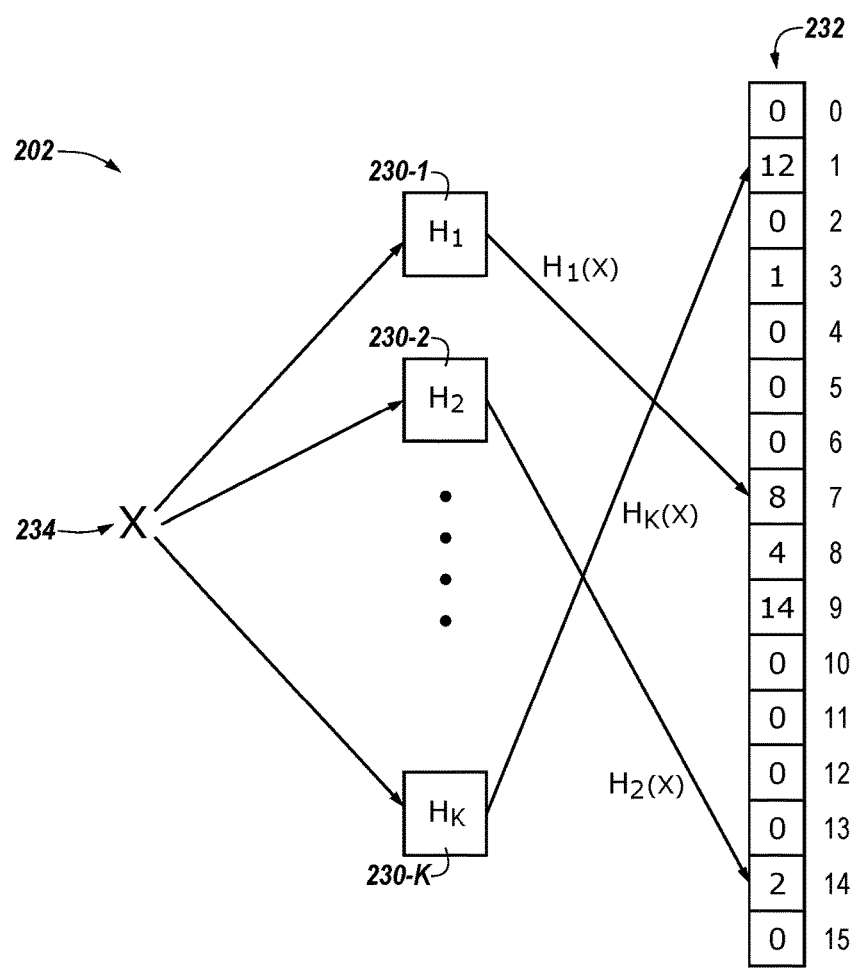
FIG. 2 illustrates a block diagram of a probabilistic data structure in accordance with a number of embodiments of the present disclosure.

FIG. 2 illustrates a block diagram of a probabilistic data structure 202 in accordance with a number of embodiments of the present disclosure. Probabilistic data structure 202 can be, for example, based on (e.g., a modified version of) a counting Bloom filter that can be used to proactively determine whether to take a corrective action on a subset of data stored in memory, as will be further described herein.

A probabilistic data structure such as a counting Bloom filter can include a number of counters (e.g., counters 232 illustrated in FIG. 2). For example, a counting Bloom filter can include M d-bit up/down counters, where M is the quantity of counters and d is quantity of bits of each respective counter. As such, the size of the counting Bloom filter can be given by M×d. When the counting Bloom filter is empty, each counter (e.g., the value of each counter) is set to 0. Although the example illustrated in FIG. 2 includes 16 counters (e.g., 0 to 15), embodiments of the present disclosure are not limited to a particular quantity of counters.

The counting Bloom filter can further include a number of (e.g., K) different hash functions, each of which can hash (e.g., map) an input (e.g., subject) element to one of the counters, preferably with a uniform random distribution. For example, the input element can be processed according to each of the K hash functions to determine the corresponding K counters to which the element is mapped, and these counters (e.g., the values of these counters) can be updated accordingly. When the value of a counter reaches a particular threshold, the counter can be reset to 0.

As an example, FIG. 2 shows probabilistic data structure (e.g., counting Bloom filter) 202 having a number of hash functions 230-1, 230-2, ..., 230-K (e.g., $H_1, H_2, \ldots, H_K$). In the example illustrated in FIG. 2, an element 234 (e.g., X) is shown as being processed by (e.g., passed through) counting Bloom filter 202 to produce respective hash outputs (e.g., $H_1(X), H_2(X), \ldots, H_K(X)$). For instance, element 234 as processed by hash function 230-1 is indicated as $H_1(X)$ and corresponds to counter 7 of counters 232 of counting Bloom filter 202, which is shown as being updated to a value of 8. Further, element 234 as processed by hash function 230-2 is indicated as $H_2(X)$ and corresponds to counter 14 of counters 232, which is shown as being updated to a value of 2. Further, element 234 as processed by hash function 230-K is indicated as $H_K(X)$ and corresponds to counter 1 of counters 232, which is shown as being updated to a value of 8. In a number of embodiments, hash functions 230-1, 230-2, ..., 230-K can produce their respective outputs based on binary operations, such as XOR operations, SHIFT operations, etc., which can make hardware and/or firmware implementation of counting Bloom filter 202 fast and/or straightforward.

As such, counting Bloom filter 202 can be used to capture the frequency at which a particular element is occurring (e.g., the frequency at which the element is input into and processed by counting Bloom filter 202). In contrast, a standard Bloom filter may simply be used to indicate inclusion, or exclusion, of elements from a particular set of elements (e.g., to check whether an element is a member of the set).

It should be noted that in some instances, the output of hash functions 230-1, 230-2, ..., 230-K may overlap for different input elements, which may result in false positive and/or false negative errors (e.g., an element being indicated to be occurring more or less frequently that it actually is). However, such errors may be reduced (e.g., minimized or optimized) based on the quantities used for M, d, and K. For instance, such errors may be reduced (e.g., minimized) in embodiments in which counting Bloom filter 202 includes two hash functions and 1024 8-bit counters (e.g., in embodiments in which M, d, and K are 1024, 8, and 2, respectively). In such embodiments, the size of the memory portion of counting Bloom filter 202 (e.g., not including the two hash functions) would be 1 kiloByte (kB). However, embodiments of the present disclosure are not limited to such embodiments.

Figure 3:
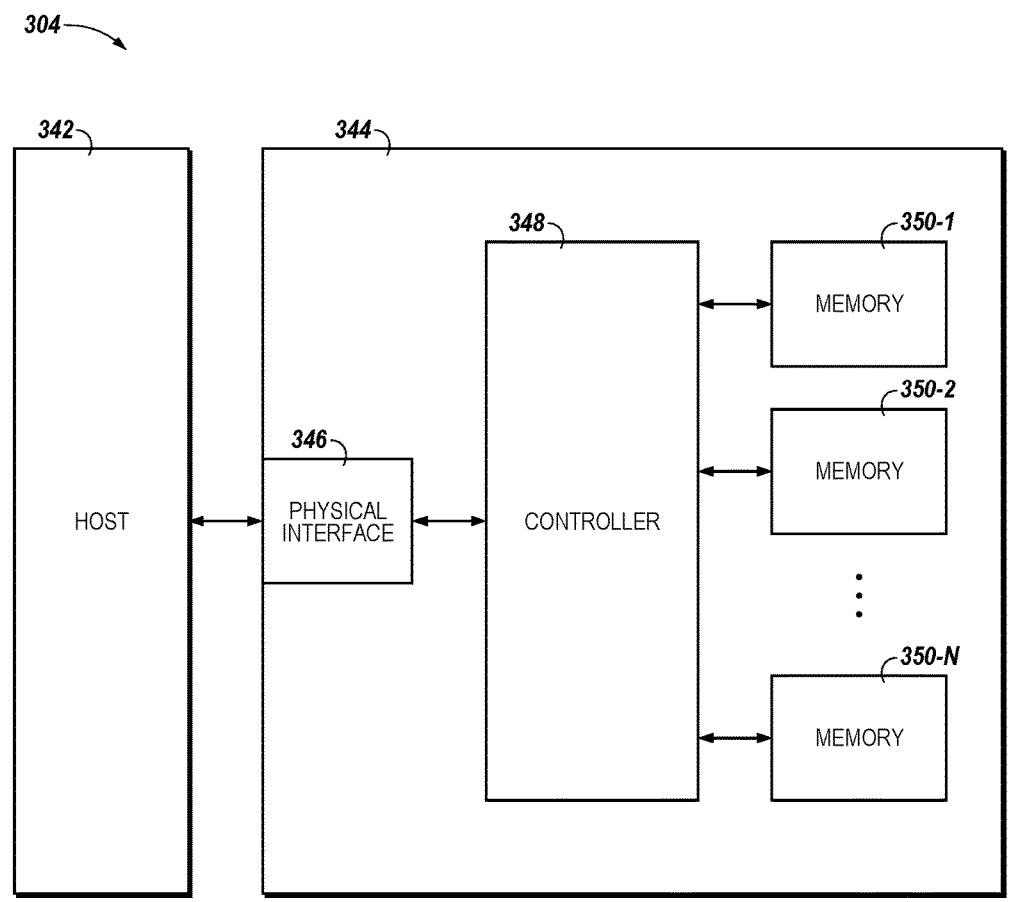
FIG. 3 is a functional block diagram of a computing system including an apparatus in the form of a memory device in accordance with a number of embodiments of the present disclosure.

FIG. 3 is a functional block diagram of a computing system 304 including an apparatus in the form of a memory device 344 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example.

Memory device 344 can be, for example, a solid state drive (SSD). In the embodiment illustrated in FIG. 3, memory device 344 includes a physical host interface 346, a number of memories 350-1, 350-2, ..., 350-N (e.g., solid state memory devices), and a controller 348 (e.g., an SSD controller) coupled to physical host interface 346 and memories 350-1, 350-2, ..., 350-N.

Memories 350-1, 350-2, ..., 350-N can include, for example, a number of non-volatile memory arrays (e.g., arrays of non-volatile memory cells). For instance, memories 350-1, 350-2, ..., 350-N can include a number of memory arrays analogous to memory array 100 previously described in connection with FIG. 1.

Physical host interface 346 can be used to communicate information between memory device 344 and another device such as a host 342. Host 342 can include a memory access device (e.g., a processor). One of ordinary skill in the art will appreciate that "a processor" can intend a number of processors, such as a parallel processing system, a number of coprocessors, etc. Example hosts can include personal laptop computers, desktop computers, digital cameras, digital recording and playback devices, mobile phones such as smart phones, PDAs, memory card readers, interface hubs, and the like.

Physical host interface 346 can be in the form of a standardized physical interface. For example, when memory device 344 is used for information storage in computing system 304, physical host interface 346 can be a serial advanced technology attachment (SATA) physical interface, a peripheral component interconnect express (PCIe) physical interface, or a universal serial bus (USB) physical interface, among other physical connectors and/or interfaces. In general, however, physical host interface 346 can provide an interface for passing control, address, information (e.g., data), and other signals between memory device 344 and a host (e.g., host 342) having compatible receptors for physical host interface 346.

Controller 348 can include, for example, control circuitry and/or logic (e.g., hardware and firmware). Controller 348 can be included on the same physical device (e.g., the same die) as memories 350-1, 350-2, ..., 350-N. For example, controller 348 can be an application specific integrated circuit (ASIC) coupled to a printed circuit board including physical host interface 346 and memories 350-1, 350-2, ..., 350-N. Alternatively, controller 348 can be included on a separate physical device that is communicatively coupled to the physical device that includes memories 350-1, 350-2, ..., 350-N. In a number of embodiments, components of controller 348 can be spread across multiple physical devices (e.g., some components on the same die as the memory, and some components on a different die, module, or board) as a distributed controller.

Controller 348 can communicate with memories 350-1, 350-2, ..., 350-N to sense (e.g., read), program (e.g., write), and/or erase information, among other operations. Controller 348 can have circuitry that may be a number of integrated circuits and/or discrete components. In a number of embodiments, the circuitry in controller 348 may include control circuitry for controlling access across memories 350-1, 350-2, ..., 350-N and/or circuitry for providing a translation layer between host 342 and memory device 344.

In a number of embodiments, controller 348 can use a probabilistic data structure, such as, for instance, probabilistic data structure (e.g., counting Bloom filter) 202 previously described in connection with FIG. 2, to track indicators (e.g., metrics) of the quality of the data stored in memories 350-1, 350-2, . . . , 350-N, including, for example, read disturb, wear leveling, and/or hot and cold data classification, among other data quality indicators, to proactively determine when corrective action may need to be taken on the data. For example, controller 348 can input information associated with a subset of the data stored in memories 350-1, 350-2, . . . , 350-N into the probabilistic data structure, and proactively determine, at least partially using the probabilistic data structure, whether to take a corrective action on the subset of data. For instance, controller 348 can use the probabilistic data structure to perform an operation on the inputted information, and proactively determine whether to take the corrective action on the subset of data based, at least in part, on the result of the operation. As used herein, "proactively" determining when corrective action may need to be taken, and "proactively" determining whether to take corrective action, can refer to determining that the corrective action may need to be taken, and determining whether to take corrective action, before the corrective action may actually need to be taken, such as, for instance, before a failure of the memory actually occurs (e.g., in anticipation that a failure will soon occur).

In a number of embodiments, the probabilistic data structure can be included in controller 348. For example, DRAM of controller 348 can be used for the counters of the probabilistic data structure.

The inputted information can correspond to element 234 previously described in connection with FIG. 2, and can be, for instance, identification information associated with the subset of data (e.g., information that identifies that subset). Further, the subset of data can be a block of data (or other unit(s) of data such as a subset of a block or multiple blocks of data), such as, for instance, a block on which a sense (e.g., read) or program (e.g., write) operation has been performed by controller 348 (e.g., a block that includes a page of memory cells on which a sense or program operation was performed). For example, the identification information can be input into the probabilistic data structure upon (e.g., responsive to) the sense or program operation being performed by controller 348.

The operation performed on the inputted information by the probabilistic data structure can include processing the inputted information by the hash functions of the probabilistic data structure, as previously described in connection with FIG. 2. For example, the output of each respective hash function can correspond to a different counter (e.g., location) of the probabilistic data structure, as previously described in connection with FIG. 2, and each of these counters (e.g., the respective values of each of these counters) can be updated (e.g., increased, decreased, or reset) accordingly. The respective values of each of the counters after they have been updated can correspond to the result of the operation performed by the probabilistic data structure.

The quantity (e.g., amount) by which each of the different counters to which the output of each respective hash function corresponds is updated (e.g., increased, decreased, or reset) can depend on the type(s) of data quality indicator being tracked by the probabilistic data structure. For example, if the information is inputted in response to a sense operation (e.g., if it was a sense operation that was performed on the subset of data), and the probabilistic data structure is tracking read disturb, each of the different counters can be updated by the quantity of pages in the subset of data on which the sense operation was performed. However, embodiments of the present disclosure are not limited to this particular example. For instance, if the probabilistic data structure is tracking hot and cold data classification, each of the different counters can be updated by the quantity of times the subset of data is accessed during sense and/or program operations performed on the subset of data. As an additional example, if the probabilistic data structure is tracking wear leveling, each of the different counters can be updated by the quantity of program and/or erase cycles performed on the subset of data.

This process can continue for subsequent inputted information (e.g., subsequent sense operations performed during operation of memory device 344), until the result of the operation performed by the probabilistic data structure (e.g., the values of the updated counters) meets or exceeds a particular threshold. The threshold can be a fixed threshold, or it can be an adjustable (e.g., programmable and/or changeable) threshold. As an example, if the probabilistic data structure is tracking read disturb, the threshold in the probabilistic data structure can be less than or equal to $(2^d)-1$, where d is the quantity of bits of each respective counter. However, embodiments of the present disclosure are not limited to this particular example.

Upon the result of the operation performed by the probabilistic data structure (e.g., the values of the updated counters) meeting or exceeding the particular threshold, the counters (e.g., the value of the counters) can be reset (e.g., to zero), and the information (e.g., the identification information) associated with the subset of data can be stored in (e.g., moved to) a cache included in controller 348. For instance, the cache can include a number of counters, and one of the counters can be associated with (e.g., assigned to) that subset of data. Each respective counter in the cache can include 32-d bits. As such, the size of the cache can be given by L×(32-d), where L is the quantity of counters in the cache and d is the quantity of bits of each respective counter in the probabilistic data structure. As an example, the cache may include 1060 counters (e.g., L may be 1060). In such an example, the size of the cache would be approximately 3.88 kB (including the cache overhead). As an additional example, the size of each counter used in the cache can be at least ceil(log 2(T-T1)), wherein ceil(.) is the ceiling function, log 2(.) is the logarithm function in base 2, T1 is the threshold in the probabilistic data structure, and T is the threshold at which a corrective action is performed.

In embodiments in which the memory of the controller in which the probabilistic data structure is included is two level memory (e.g., includes two level memory cells), the probabilistic data structure may be included in a first (e.g., one) of the two levels, and the cache may be included in a second of the two levels (e.g., the other level). In embodiments in which the memory of the controller in which the probabilistic data structure is included is triple level memories (e.g., includes TLCs), the probabilistic data structure may be included in a first level and a second level (e.g., two of the three levels), and the cache may be included in a third level (e.g., the remaining level).

Upon the information associated with the subset of data being stored in the cache, subsequent sense operations performed on the subset of data may not result in the information associated with the subset being inputted into the probabilistic data structure. Rather, the counter in the cache that is associated with the subset of data can be updated upon (e.g., responsive to) each subsequent sense operation performed on the subset. The quantity (e.g., amount) by which the counter in the cache is updated can correspond to the quantity by which the counters of the probabilistic data structure were updated. For instance, if the probabilistic data structure is tracking read disturb and the counters of the probabilistic data structure were being updated by the quantity of pages in the subset of data on which the sense operation was performed, then the counter in the cache may also be updated by the quantity of pages in the subset on which the sense operation was performed.

This process can continue until the value of the counter in the cache that is associated with the subset of data meets or exceeds a particular threshold. The threshold can be a fixed threshold, or it can be an adjustable (e.g., programmable and/or changeable) threshold. Further, this threshold may be much larger (e.g., orders of magnitude larger) than the threshold used in the probabilistic data structure. As such, the probabilistic data structure can be used to dynamically filter subsets of data stored in memories 350-1, 350-2, . . . , 350-N that may be likely to be decreasing in quality, such as, for instance, subsets of data that may be reaching a high read disturb count, and these subsets of data can then be further tracked using the cache.

Upon the value of the counter in the cache that is associated with the subset of data meeting or exceeding the cache threshold, controller 348 can take the corrective action on the subset of data, and the counter (e.g., the value of the counter) can be reset (e.g., to zero) and the information associated with the subset of data can be removed from the cache. The corrective action can be, for example, a relocation of the subset of data to a different location (e.g., a different physical location) in memories 350-1, 350-2, . . . , 350-N. For instance, the subset of data can be programmed to and/or stored in a different page, block, or die of memories 350-1, 350-2, . . . , 350-N. As an additional example, in embodiments in which memories 350-1, 350-2, . . . , 350-N include SLCs and MLCs, the corrective action can include programming data of the subset that is stored in the SLCs of memories 350-1, 350-2, . . . , 350-N to the MLCs of memories 350-1, 350-2, . . . , 350-N (e.g., folding the SLC data to the MLCs, or vice versa). For instance, the SLC data can be folded to another physical location in memories 350-1, 350-2, . . . , 350-N with MLC configuration, or vice versa.

In a number of embodiments, such as, for example, embodiments in which the probabilistic data structure is being used to track read disturb, a program operation performed on the subset of data can result in a reset of the probabilistic data structure and/or cache. For example, the information (e.g., the identification information) associated with the subset of data can be input into the probabilistic data structure upon (e.g., responsive to) the program operation, and the inputted information can be processed by the probabilistic data structure, in a manner analogous to that previously described herein. However, instead of updating each of the different counters of the probabilistic data structure to which the output of each respective hash function of the probabilistic data structure corresponds (e.g., as would occur in response to a sense operation), each of the different counters (e.g. the value of each of the different counters) can be reset (e.g., to zero). Further, if the information associated with the subset of data is stored in the cache (e.g., if the program operation occurs after the probabilistic data structure threshold was met or exceeded and the information was moved from the probabilistic data structure to the cache), the counter in the cache associated with the subset of data can be reset, and the information can be removed from the cache, responsive to the program operation.

Using a probabilistic data structure to track data quality indicators in accordance with the present disclosure can use (e.g. consume) a significantly lower portion of controller 348 (e.g., of the memory of controller 348) than would be used by previous approaches of tracking data quality indicators, such as approaches in which a different counter is assigned to track data quality indicators for each respective subset (e.g., block) of data stored in the memory. For instance, using a probabilistic data structure to track data quality indicators in accordance with the present disclosure can eliminate the need to assign a counter (e.g., a dedicated counter) in controller 348 and/or memories 350-1, 350-2, . . . , 350-N to each respective subset, as with such previous approaches.

For instance, in the example previously described herein, the probabilistic data structure can have a size of 1 kB, and the cache can have a size of approximately 3.88 kB, for a total of approximately 4.88 kB of memory dedicated to tracking data quality indicators. In contrast, a previous approach may use a cache having a size of 20 kB that would be dedicated to tracking data quality indicators. As such, embodiments of the present disclosure may use significantly less memory, for instance, approximately 75% less memory, than such previous approaches for tracking data quality indicators.

Further, embodiments of the present disclosure can track data quality indicators in memories 350-1, 350-2, . . . , 350-N effectively and/or accurately (e.g., just as effectively and/or accurately as previous approaches that use significantly more memory). For instance, as previously described herein, the output of the hash functions of the probabilistic data structure may overlap for different input elements, which may result in false positive and/or false negative errors, which may in turn result in corrective actions being taken when they may not actually be needed and/or corrective actions not being taken when they may actually be needed. However, as previously described herein, such errors may be reduced (e.g., minimized) based on the quantities used for M, d, and K in the probabilistic data structure. For instance, using values of 1024, 8, and 2, for M, d, and K, respectively, as described in the example described in connection with FIG. 2, can result in an error rate of approximately $1.5 \times 10^5$, which may be negligible as compared to an ideal, error-free system. However, this is just an example illustration, and embodiments of the present disclosure are not so limited.

The embodiment illustrated in FIG. 3 can include additional circuitry, logic, and/or components not illustrated so as not to obscure embodiments of the present disclosure. For example, memory device 344 can include address circuitry to latch address signals provided over I/O connectors through I/O circuitry. Address signals can be received and decoded by a row decoder and a column decoder, to access memories 350-1, 350-2, . . . , 350-N.

Figure 4:
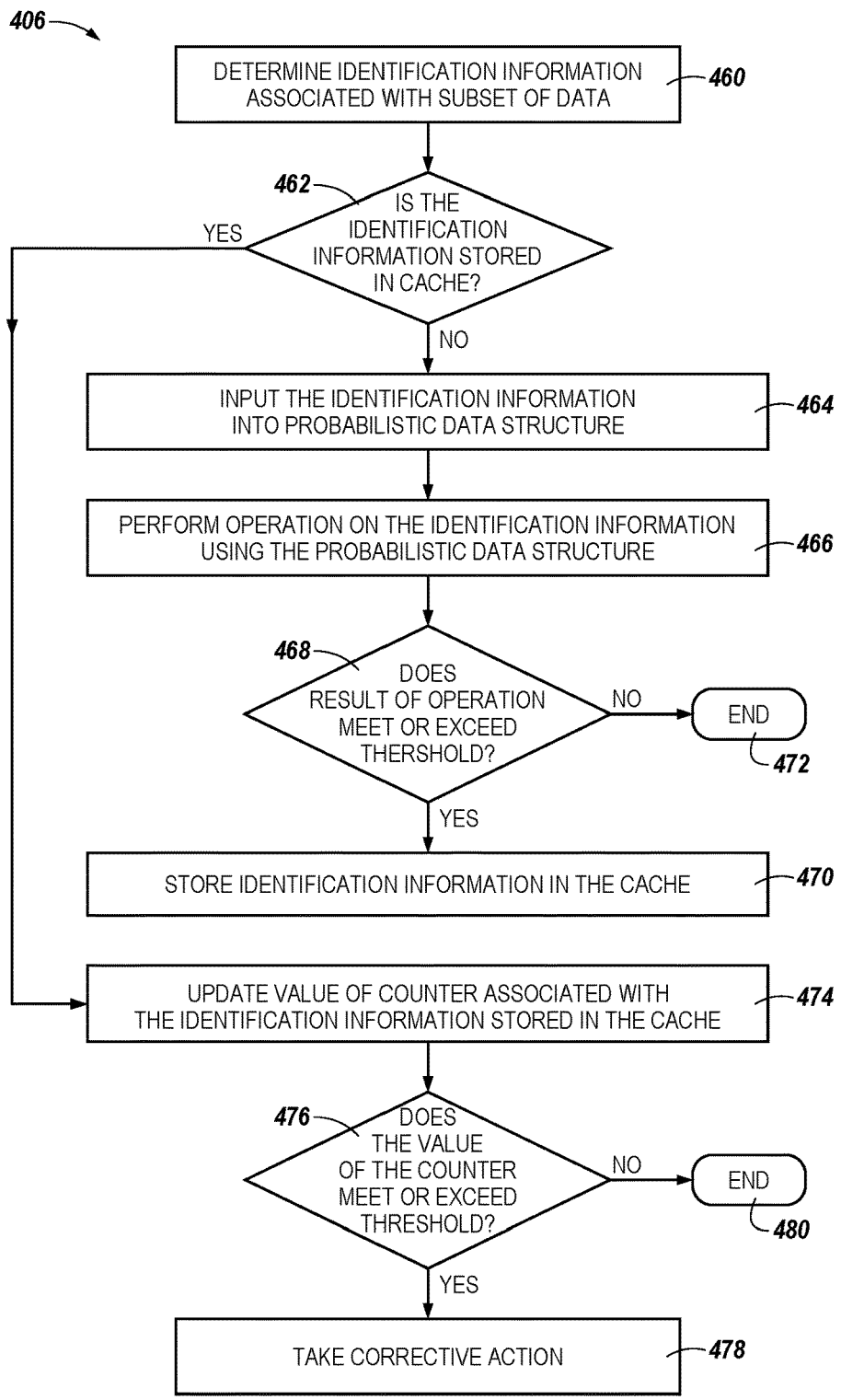
FIG. 4 illustrates a method for operating memory in accordance with a number of embodiments of the present disclosure.

FIG. 4 illustrates a method 406 for operating memory, such as, for instance, memories 350-1, 350-2, . . . , 350-N previously described in connection with FIG. 3, in accordance with a number of embodiments of the present disclosure. Method 406 can be performed by, for example, controller 348 previously described in connection with FIG. 3.

Method 406 can be used, for example, to track indicators of data quality in memory to proactively determine when corrective action may need to be taken on the data. For instance, method 406 can be used to track read disturb in memory. However, embodiments of the present disclosure are not so limited, and method 406 could be used to track other data quality indicators, as previously described herein.

At block 460, method 406 includes determining identification information associated with a subset of data stored in the memory. The subset of data can be, for example, a block of data on which a sense (e.g., read) operation has been performed, as previously described herein (e.g., in connection with FIG. 3). That is, method 406 may be used when a sense operation has been performed. The identification information can be determined by, for example, mapping the logical block address (LBA) associated with the sense operation (e.g., the LBA used to identify the subset of data on which the sense operation was performed).

At block 462, method 406 includes determining whether the identification information associated with the subset of data is stored in a cache. For instance, the cache can include a number of counters, as previously described herein (e.g., in connection with FIG. 3), and determining whether the identification information is stored in the cache can include determining whether any of the counters are associated with the identification information (e.g., assigned to the subset of data).

If it is determined that the identification information associated with the subset of data is not stored in the cache, then the identification information can be input into a probabilistic data structure at block 464. The probabilistic data structure can be, for example, probabilistic data structure (e.g., counting Bloom filter) 202 described in connection with FIG. 2. For instance, the inputted information can correspond to element 234 previously described in connection with FIG. 2.

At block 466, method 406 includes performing an operation on the inputted identification information using the probabilistic data structure. The operation can include processing the inputted information by the hash functions of the probabilistic data structure, as previously described herein (e.g., in connection with FIGS. 2 and 3).

At block 468, method 406 includes determining whether the result of the operation meets or exceeds a particular threshold. The result of the operation can correspond to the values of the counters of the probabilistic data structures that were updated during the operation, as previously described herein (e.g., in connection with FIG. 3).

If it is determined that the result of the operation (e.g., the values of the counters that were updated during the operation) does not meet or exceed the threshold, method 406 ends at block 472. If it is determined that the result of the operation meets or exceeds the threshold, then the identification information is stored in the cache (e.g., one of the counters of the cache can be assigned to the identification information) at block 470, and the values of the counters of the probabilistic data structure that were updated during the operation can be reset.

If it is determined that the identification information associated with the subset of data is stored in the cache (e.g., the identification information has been assigned to one of the counters of the cache) at block 462, the value of that counter is updated at block 474. The quantity (e.g., amount) by which the counter is updated can correspond to the quantity by which the counters of the probabilistic data structure were updated, as previously described herein (e.g., in connection with FIG. 3).

At block 476, method 406 includes determining whether the value of the counter of the cache that was updated at block 474 meets or exceeds a particular threshold. This threshold may be much larger than the threshold used in the probabilistic data structure, as previously described herein (e.g., in connection with FIG. 3).

If it is determined that the value of the counter of the cache does not meet or exceed the threshold, method 406 ends at block 480. If it is determined that the value of the counter of the cache meets or exceeds the threshold, a corrective action on the subset of data is taken at block 478, and the identification information associated with the subset of data is removed from the cache. The corrective action can be, for example, a relocation of the subset of data to a different location in the memory, and/or can include programming data of the subset that is stored in SLCs of the memory to MLCs of the memory (or vice versa), as previously described herein (e.g., in connection with FIG. 3).

Figure 5:
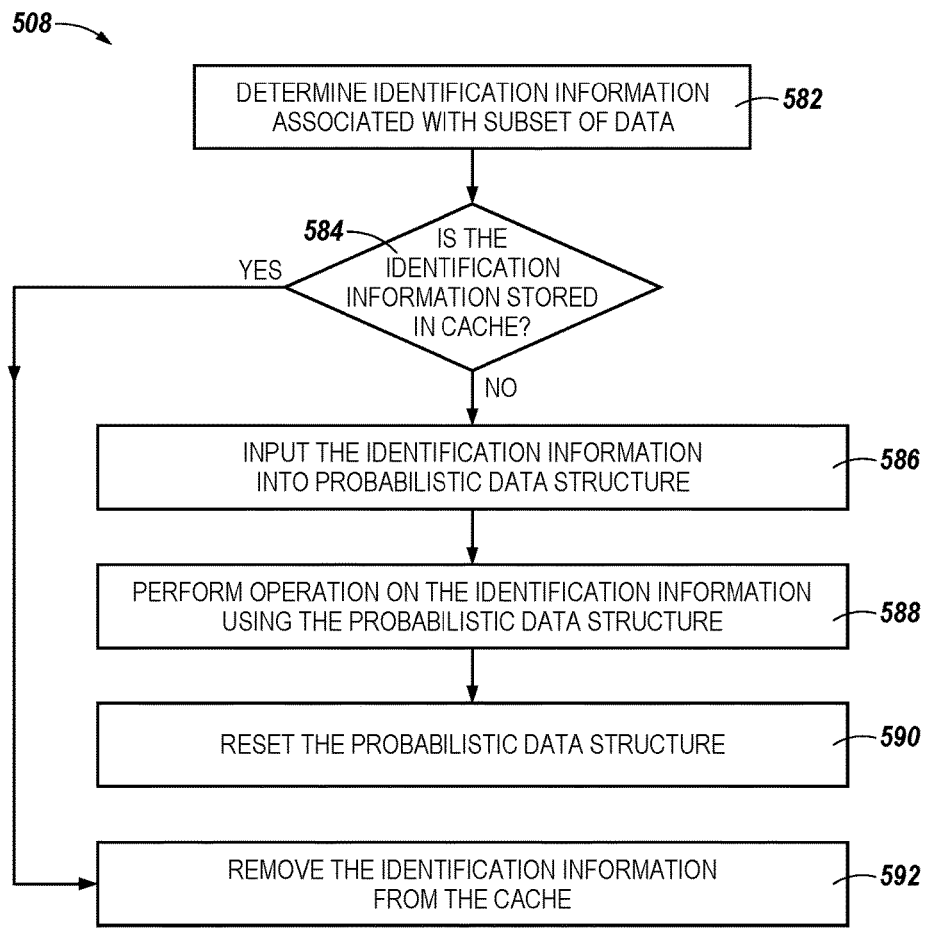
FIG. 5 illustrates a method for operating memory in accordance with a number of embodiments of the present disclosure.

FIG. 5 illustrates a method 508 for operating memory, such as, for instance, memories 350-1, 350-2, . . . , 350-N previously described in connection with FIG. 3, in accordance with a number of embodiments of the present disclosure. Method 508 can be performed by, for example, controller 348 previously described in connection with FIG. 3.

Method 508 can be used, for example, to track indicators of data quality in memory to proactively determine when corrective action may need to be taken on the data. For instance, method 508 can be used to track read disturb in memory. However, embodiments of the present disclosure are not so limited, and method 508 could be used to track other data quality indicators, as previously described herein.

Further, in a number of embodiments, method 508 may only be used (e.g., triggered) if the quantity of pages affected by a program operation performed on a subset (e.g., block) of data meets or exceeds a particular threshold. For instance, in such embodiments, if this threshold is 100, and only 50 pages are programmed during a program operation, method 508 would not be triggered. Additionally or alternatively, in a number of embodiments, method 508 may only be used (e.g., triggered) if a particular type or types if program operation is performed on a subset of data. For instance, in such embodiments, method 508 may only be triggered if the program operation is re-programming data to a portion of the subset (e.g., programming data to a portion of the subset that has previously had data programmed thereto).

At block 582, method 508 includes determining identification information associated with a subset of data stored in the memory. The subset of data can be, for example, a block of data on which a program (e.g., write) operation has been performed, as previously described herein (e.g., in connection with FIG. 3). That is, method 508 may be used when a program operation has been performed. The identification information can be determined by, for example, mapping the logical block address (LBA) associated with the program operation (e.g., the LBA used to identify the subset of data on which the program operation was performed).

At block 584, method 508 includes determining whether the identification information associated with the subset of data is stored in a cache. For instance, the cache can include a number of counters, as previously described herein (e.g., in connection with FIG. 3), and determining whether the identification information is stored in the cache can include determining whether any of the counters are associated with the identification information (e.g., assigned to the subset of data).

If it is determined that the identification information associated with the subset of data is not stored in the cache, then the identification information can be input into a probabilistic data structure at block 586. The probabilistic data structure can be, for example, probabilistic data structure (e.g., counting Bloom filter) 202 described in connection with FIG. 2. For instance, the inputted information can correspond to element 234 previously described in connection with FIG. 2.

At block 588, method 508 includes performing an operation on the inputted identification information using the probabilistic data structure. The operation can include processing the inputted information by the hash functions of the probabilistic data structure, as previously described herein (e.g., in connection with FIGS. 2 and 3). However, instead of the operation updating each of the different counters of the probabilistic data structure to which the output of each respective hash function of the probabilistic data structure corresponds (e.g., as would occur in response to a sense operation, such as, for instance, at block 466 of method 406 described in connection with FIG. 4), the operation may reset (e.g., to zero) each of the different counters (e.g. the value of each of the different counters). That is, method 508 includes resetting these counters of the probabilistic data structure at block 590.

If it is determined that the identification information associated with the subset of data is stored in the cache at block 584, the identification information is removed from the cache at block 592. For instance, the counter in the cache that is associated with the identification information can be reset.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory; and
circuitry configured to:
input identification information associated with a subset of data stored in the memory into a probabilistic data structure, wherein the probabilistic data structure is configured to capture a frequency at which the identification information associated with the subset of data is input into the probabilistic data structure; and
proactively determine, at least partially using the probabilistic data structure, whether to take a corrective action on the subset of data stored in the memory.

2. The apparatus of claim 1, wherein the probabilistic data structure is based on a counting Bloom filter.

3. The apparatus of claim 1, wherein:
the subset of data stored in the memory is a block of data; and
the inputted information includes identification information for the block of data.

4. The apparatus of claim 1, wherein the corrective action includes programming data of the subset stored in single level cells of the memory to multilevel cells of the memory.

5. The apparatus of claim 1, wherein the corrective action includes programming data of the subset stored in multilevel cells of the memory to single level cells of the memory.

6. A method for operating memory, comprising:
inputting identification information associated with a subset of data stored in a memory into a probabilistic data structure, wherein the probabilistic data structure is configured to capture a frequency at which the identification information associated with the subset of data is input into the probabilistic data structure;
performing, by the probabilistic data structure, an operation on the inputted identification information; and
proactively determining whether to take a corrective action on the subset of data based, at least in part, on a result of the operation performed by the probabilistic data structure.

7. The method of claim 6, wherein performing the operation on the inputted identification information includes:
processing the inputted identification information by a number of hash functions of the probabilistic data structure, wherein an output of each respective hash function corresponds to a different counter of the probabilistic data structure; and
updating each of the different counters to which the output of each respective hash function corresponds.

8. The method of claim 7, wherein the method includes updating each of the different counters by a quantity of pages in the subset of data on which a sense operation was performed.

9. The method of claim 7, wherein the method includes updating each of the different counters by a quantity of times the subset of data was accessed during a sense or program operation performed on at least a portion of the subset of data.

10. The method of claim 7, wherein the method includes updating each of the different counters by a quantity of program and/or erase cycles performed on at least a portion of the subset of data.

11. The method of claim 7, wherein the result of the operation performed by the probabilistic data structure corresponds to a value of each of the different counters after they have been updated.

12. The method of claim 7, wherein the number of hash functions is two.

13. An apparatus, comprising:
a memory; and
circuitry configured to:
determine whether identification information associated with a subset of data stored in the memory is stored in a cache;
input the identification information associated with the subset of data into a probabilistic data structure upon determining the identification information is not stored in the cache, wherein the probabilistic data structure is configured to capture a frequency at which the identification information associated with the subset of data is input into the probabilistic data structure;

perform, using the probabilistic data structure, an operation on the inputted identification information; and proactively determine whether to take a corrective action on the subset of data based, at least in part, on a result of the operation.

14. The apparatus of claim 13, wherein the circuitry is configured to:
   determine whether the result of the operation meets or exceeds a particular threshold; and
   store the identification information in the cache upon determining the result of the operation meets or exceeds the particular threshold.

15. The apparatus of claim 13, wherein the circuitry is configured to, upon determining the identification information associated with the subset of data is stored in the cache:
   update a counter associated with the identification information stored in the cache;
   determine whether a value of the counter meets or exceeds a particular threshold upon updating the counter; and
   determine whether to take the corrective action on the subset of data based, at least in part, on whether the value of the counter meets or exceeds the particular threshold.

16. The apparatus of claim 15, wherein the circuitry is configured to take the corrective action upon determining the value of the counter meets or exceeds the particular threshold.

17. The apparatus of claim 15, wherein the circuitry is configured to remove the identification information associated with the subset of data from the cache upon determining the value of the counter meets or exceeds the particular threshold.

18. The apparatus of claim 13, wherein performing the operation on the inputted identification information includes:
   processing the inputted identification information by a number of hash functions of the probabilistic data structure, wherein an output of each respective hash function corresponds to a different counter of the probabilistic data structure; and
   decreasing or resetting each of the different counters to which the output of each respective hash function corresponds if a program operation was performed on at least a portion of the subset of data.

19. The apparatus of claim 13, wherein:
   a size of the probabilistic data structure is given by M×d, wherein M is a quantity of counters of the probabilistic data structure and d is a quantity of bits of each respective counter.

20. The apparatus of claim 13, wherein the apparatus includes two level memory, wherein a first level of the two level memory includes the probabilistic data structure and a second level of the two level memory includes the cache.

21. The apparatus of claim 13, wherein the apparatus includes triple level memory, wherein a first level and a second level of the triple level memory include the probabilistic data structure and a third level of the triple level memory includes the cache.

22. A method for operating memory, comprising:
   performing, by a probabilistic data structure, an operation on identification information associated with a subset of data stored in a memory, wherein the probabilistic data structure is configured to capture a frequency at which the identification information associated with the subset of data is input into the probabilistic data structure;
   determining whether a result of the operation performed by the probabilistic data structure meets or exceeds a particular threshold; and
   proactively determining whether to take a corrective action on the subset of data based, at least in part, on whether the result of the operation performed by the probabilistic data structure meets or exceeds the particular threshold.

23. The method of claim 22, wherein the method includes storing the identification information in a cache upon determining the result of the operation performed by the probabilistic data structure meets or exceeds the particular threshold.

24. The method of claim 22, wherein the method includes resetting a counter of the probabilistic data structure corresponding to the identification information upon determining the result of the operation performed by the probabilistic data structure meets or exceeds the particular threshold.

25. The method of claim 22, wherein the corrective action includes a relocation of the subset of data to a different location in the memory.

26. The method of claim 22, wherein the particular threshold is an adjustable threshold.

27. An apparatus, comprising:
   a memory; and
   circuitry configured to:
      perform a sense operation to sense at least a portion of a block of data stored in the memory;
      input identification information for the sensed block of data into a counting Bloom filter, wherein the counting Bloom filter is configured to capture a frequency at which the identification information for the sensed block of data is input into the probabilistic data structure; and
      proactively determine, at least partially using the counting Bloom filter, whether to take corrective action on the block of data.

28. The apparatus of claim 27, wherein the circuitry is configured to determine the identification information for the block of data by mapping a logical block address associated with the sense operation.

29. The apparatus of claim 27, wherein the circuitry is configured to:
   perform a program operation on at least a portion of a block of data stored in the memory;
   determine whether identification information for the programmed block of data is stored in a cache;
   input the identification information for the programmed block of data into the counting Bloom filter upon determining the identification information for the programmed block of data is not stored in the cache;
   perform, using the counting Bloom filter, an operation on the inputted identification information for the programmed block of data; and
   reset corresponding counters of the counting Bloom filter upon performing the operation.

30. The apparatus of claim 29, wherein the circuitry is configured to remove the identification information for the currently programmed block of data from the cache upon determining the identification information for the programmed block of data is stored in the cache.

31. The apparatus of claim 29, wherein:
   performing the operation includes processing the inputted identification information for the programmed block of data by a number of hash functions of the counting Bloom filter, wherein an output of each respective hash function corresponds to a different counter of the counting Bloom filter; and resetting the counting Bloom filter includes resetting each of the different counters to which the output of each respective hash function corresponds.

* * * * *